(12) United States Patent
Hagstrom

(10) Patent No.: US 11,685,164 B2
(45) Date of Patent: Jun. 27, 2023

(54) HINGED PRINTER HOUSING

(71) Applicant: Primera Technology, Inc., Plymouth, MN (US)

(72) Inventor: Erick Hagstrom, Wayzata, MN (US)

(73) Assignee: PRIMERA TECHNOLOGY, INC., Plymouth, MN (US)

( * ) Notice: Subject to any disclaimer, the term of this patent is extended or adjusted under 35 U.S.C. 154(b) by 0 days.

(21) Appl. No.: 17/004,908

(22) Filed: Aug. 27, 2020

(65) Prior Publication Data

US 2021/0060989 A1 Mar. 4, 2021

Related U.S. Application Data

(60) Provisional application No. 62/894,323, filed on Aug. 30, 2019.

(51) Int. Cl.
*B41J 29/13* (2006.01)
*B41J 2/175* (2006.01)
(Continued)

(52) U.S. Cl.
CPC .......... *B41J 2/17563* (2013.01); *A21D 13/24* (2017.01); *A21D 13/80* (2017.01); *A23P 20/18* (2016.08); *A23P 20/20* (2016.08); *B29C 64/00* (2017.08); *B41J 2/1714* (2013.01); *B41J 2/1721* (2013.01); *B41J 3/407* (2013.01); *B41J 3/4073* (2013.01); *B41J 3/40731* (2020.08);
(Continued)

(58) Field of Classification Search
None
See application file for complete search history.

(56) References Cited

U.S. PATENT DOCUMENTS

| 4,531,292 A | 7/1985 | Pasternak |
| 4,981,074 A | 1/1991 | Machita et al. |

(Continued)

FOREIGN PATENT DOCUMENTS

| CN | 1868754 A | 11/2006 |
| CN | 201325212 Y | 10/2009 |

(Continued)

OTHER PUBLICATIONS

International Search Report issued for PCT/US2020/048406, dated Nov. 26, 2020.

(Continued)

*Primary Examiner* — Erica S Lin
*Assistant Examiner* — Tracey M McMillion
(74) *Attorney, Agent, or Firm* — Westman, Champlin & Koehler, P.A.; Z. Peter Sawicki; Amanda M. Prose

(57) ABSTRACT

A printer housing with an upper portion and a lower portion with a cavity there between and wherein the upper portion and lower portion are connected by one or more hinges such that the housing opens about the hinged connection between the upper portion and the lower portion to expose the cavity there between. The hinged connection allows the upper portion to be lifted up with respect to the lower portion to expose one or more printer components for access through the cavity. One or more hinges secure the upper portion to the lower portion and wherein the one or more hinges are positioned on a same perimeter side of the housing such that the housing opens about one side.

14 Claims, 6 Drawing Sheets

(51) Int. Cl.
  *B41J 2/17* (2006.01)
  *A23P 20/18* (2016.01)
  *B41J 3/407* (2006.01)
  *B41J 29/02* (2006.01)
  *A23P 20/20* (2016.01)
  *B41J 13/00* (2006.01)
  *B41M 5/00* (2006.01)
  *A21D 13/80* (2017.01)
  *A21D 13/24* (2017.01)
  *B41J 29/17* (2006.01)
  *B29C 64/00* (2017.01)
  *A23P 20/25* (2016.01)

(52) U.S. Cl.
  CPC ........... *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,505,775 | A | 4/1996 | Kitos |
| 5,795,395 | A | 8/1998 | Ben-Matitayhu et al. |
| 5,988,787 | A | 11/1999 | Watanabe et al. |
| 2004/0114192 | A1 | 6/2004 | Jensen |
| 2006/0119628 | A1 | 6/2006 | Kofman et al. |
| 2009/0021548 | A1 | 1/2009 | Suzuki et al. |
| 2011/0025735 | A1 | 2/2011 | Nohilly et al. |
| 2012/0141636 | A1 | 6/2012 | Ackley, Jr. et al. |
| 2013/0314721 | A1 | 11/2013 | Colonel et al. |
| 2017/0217194 | A1* | 8/2017 | Okawa .................... B41J 2/175 |
| 2019/0135002 | A1* | 5/2019 | Celinder .................. B41J 2/32 |

FOREIGN PATENT DOCUMENTS

| | | | |
|---|---|---|---|
| CN | 105346266 | A | 2/2016 |
| CN | 205865873 | U * | 1/2017 |
| CN | 207128411 | U | 3/2018 |
| EP | 2666643 | A1 | 11/2013 |
| JP | 5346728 | A | 12/1993 |
| JP | 2005327918 | A | 11/2005 |
| JP | 2007136729 | A | 6/2007 |
| JP | 2013078894 | A | 5/2013 |
| JP | 2017193082 | A * | 10/2017 |
| KR | 20040027323 | A | 4/2004 |
| RU | 2224955 | C2 | 2/2004 |
| WO | 1997/027759 | A1 | 8/1997 |
| WO | 1999013707 | A1 | 3/1999 |
| WO | 2001/029748 | A1 | 4/2001 |
| WO | 20050070678 | A1 | 8/2005 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.
European Search Report issued for EP 22158785.0, dated Jul. 29, 2022.

* cited by examiner

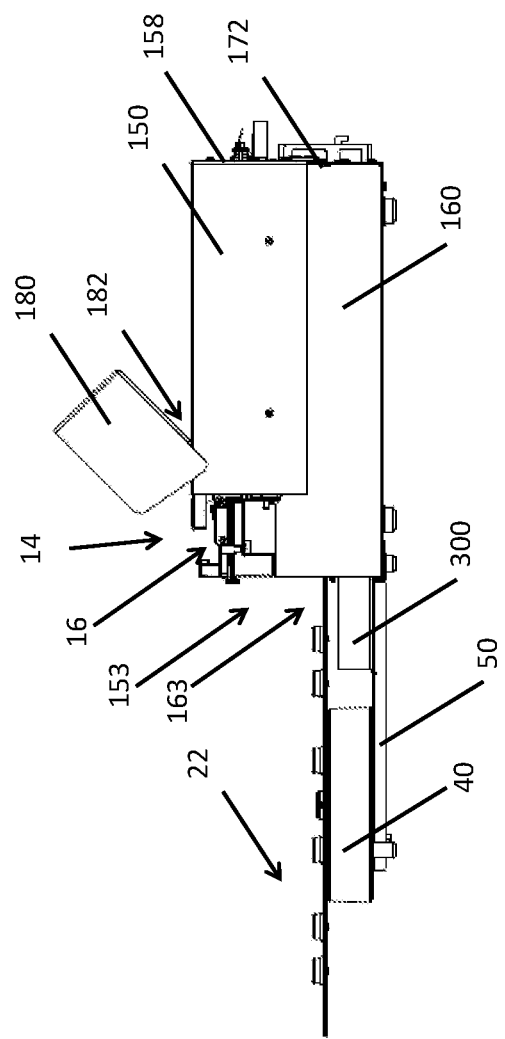

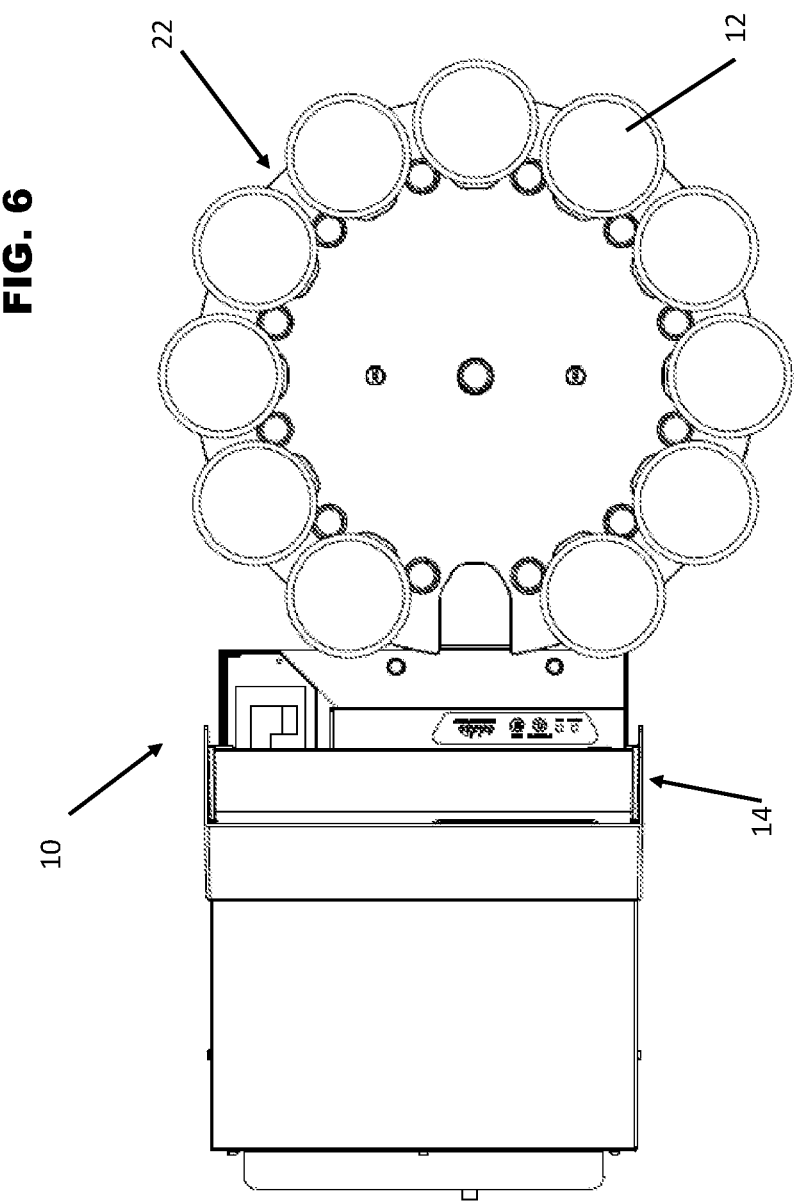

HINGED PRINTER HOUSING

CROSS-REFERENCE TO RELATED APPLICATION

The present application claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, can be printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

Printing on food products includes movement of the food product through a print area which generates debris in the form of crumbs.

A printer system may be difficult to clean and access to internal operational components may require at least partial disassembly of the printer system, making removal of crumbs or ink buildup difficult.

SUMMARY

An aspect of the present disclosure relates to a printer with a hinged housing. The housing has an upper portion and a lower portion with a cavity there between and wherein the upper portion and lower portion are connected by one or more hinges such that the housing opens about the hinged connection between the upper portion and the lower portion to expose the cavity there between.

The upper portion is positioned above the lower portion and the hinged connection allows the upper portion to be lifted up with respect to the lower portion to expose one or more printer components for access through the cavity.

The one or more hinges secure the upper portion to the lower portion and wherein the one or more hinges are positioned on a same perimeter side of the housing such that the housing opens about one side.

The one or more hinges are provided on a rear side of the housing to connect the upper portion to the lower portion and wherein a front side of the housing comprises an opening for positioning a print surface a print head and within a print area within the cavity.

The upper portion has a top and one or more perimeter side walls extending downwardly therefrom and wherein the lower portion comprises a floor and one or more perimeter side walls extending upwardly therefrom such that a rear perimeter side wall of the upper portion and a rear perimeter side wall of the lower portion are connected by the one or more hinges spaced apart along the rear perimeter side wall.

The upper portion supports a frame for operably retaining one or more printer components selected from the group consisting of a print head, a gantry for linear movement of the print head there along, a controller for the printer system, a print head ink maintenance system for cleaning one or more nozzles of the print head or combinations thereof.

The lower portion comprises a floor and supports one or more removable components for the printer comprising an ink mist collection system, a debris tray or a combination thereof.

In one or more embodiments, the printer is a printer for printing on the surface of a food product and wherein one of the upper portion or lower portion operably supports a receiving arm that is extendable and retractable into the cavity and across a path of a print head of the printer for providing food products to the print head for printing thereon.

The lower portion has a floor configured to be removably coupled to a housing of a motorized base which operably supports a delivery tray that is operational in synch with the receiving arm.

The printer is openable about the hinged connection to expose one or more removable components for cleaning, service or replacement wherein the printer is openable and closeable manually and without tools.

Another aspect of the present disclosure relates to a printer having a multi-piece housing wherein the multi-piece housing comprises two hinged connections including a first hinged connection between a base housing and printer body housing and a second hinged connection between the printer body housing and a cover portion for first side access to the printer body housing such that the hinged connections allow for selective manual access to the components of the printer.

The first hinged connection is positioned on a second side of the printer and the second hinged connection is positioned on a first side of the printer and wherein the first and second sides are opposing sides of the printer.

The first side is a front of the printer and the second side is a rear of the printer.

The base housing comprises a floor, and three side walls extending upwardly therefrom such that one side is an open side in addition to an open top of the base housing.

The printer body housing comprises a top and three side walls extending downwardly therefrom such that one side is an open side in addition to an open bottom of the printer body housing.

In one aspect, the cover portion housing comprises a top and three side walls extending downwardly therefrom such that one side is an open side in addition to an open bottom and wherein the second hinged connection connects the open side of the cover portion and the open side of the printer body housing such that when closed, the cover portion and the printer body housing enclose the printer components operably supported by the printer body housing with a top and four perimeter side walls.

In one aspect, surfaces for printing are provided to a print head through the open side of the base housing.

The base housing is comprised of aluminum, stainless steel, a food grade metal, hard plastic or a combination thereof.

The printer body housing is comprised of aluminum, stainless steel, a food grade metal, hard plastic or a combination thereof.

The cover portion is comprised of aluminum, stainless steel, a food grade metal, hard plastic, or a combination thereof.

Another aspect of the present disclosure relates to a printer system wherein the working components and various debris collection and maintenance components are easily accessible for cleaning and/or removal or replacement. The printer system has a main body and a support base that are connected together in a manner that provides a cavity there between and wherein one or both of the main body and the support base operably supports one or more print components such that when in a closed position, the printer system accepts substrates for printing thereon. The main body and the support base are also pivotally or hingedly connected such that the main body and the support base provide a printer system that is openable, allowing the main body and support base to remain connected while opening to expose the cavity and the interior components of the printer for maintenance, service, and cleaning.

In one aspect, the printer system is a printer for printing images or other content, generally with edible ink, on a surface of an edible food product. The edible food product printer of the present disclosure allows a user to print edible ink directly on food products at both low and higher volumes of food products.

BRIEF DESCRIPTION OF THE DRAWINGS

FIG. 5 is a side view of the printing system with the cover portion open.

FIG. 6 is a top view of the printing system with a cover portion open.

DETAILED DESCRIPTION

A printer system having a hinged housing allows for easy access to the interior components of the printer and to the print area of the printer, making it easier to clean and service the printer without disassembly of the housing or the use of tools. The printer system described herein is a printer having a main body or an upper portion, and a support base or lower portion. The two portions are connected in a manner that allows the upper portion of the printer to lift up for full access to the interior parts and print area of servicing and cleaning of one or more components. The upper portion lifts up to expose the printer components carried by both the upper and lower portions while remaining connected to the lower portion such that accessing the interior components of the printer is easy. Replacement of the upper portion on top of the lower portion is easy and likewise does not require tools.

In one embodiment, the connection is a hinged connection where one or more hinges enable opening the printer. The housing may also have one or more hinged covers for targeted access to print components, for example, those carried by the upper portion.

The printer system may also have one or more maintenance or collection systems for ink, ink mist, crumbs, debris or the like, a substrate receiving arm or other print item delivery structures in a print area of the printer. These systems and structures may be removable for cleaning and removal being made easier by the openable printer system described herein.

In the embodiment illustrated herein, the printer system is a food product printing system that includes a printer system for printing an image on a surface of the food product. The print surface may be an actual surface of the food product itself. The printer system comprises a printer having a receiving arm and a delivery tray supported on a base spaced apart and separable from the printer. While the embodiment illustrated herein is a food product printing system, the embodiments described herein may be incorporated into a printing system for use on non-food items and other items, substrates or products having a height, mass or dimensions for printing in the print area described herein.

Opening the printer in the manner described herein allows for easy visual and physical access to both the upper portion and lower portion of the printer for inspection and cleaning. Opening the printer as described herein also allows for easy inspection, cleaning, and/or removal of various collection and cleaning elements of the printer system such as a print debris or crumb collection tray, ink mist or printed ink mist filtration system, and/or a print cartridge maintenance tub and associated filter.

Figure 1:
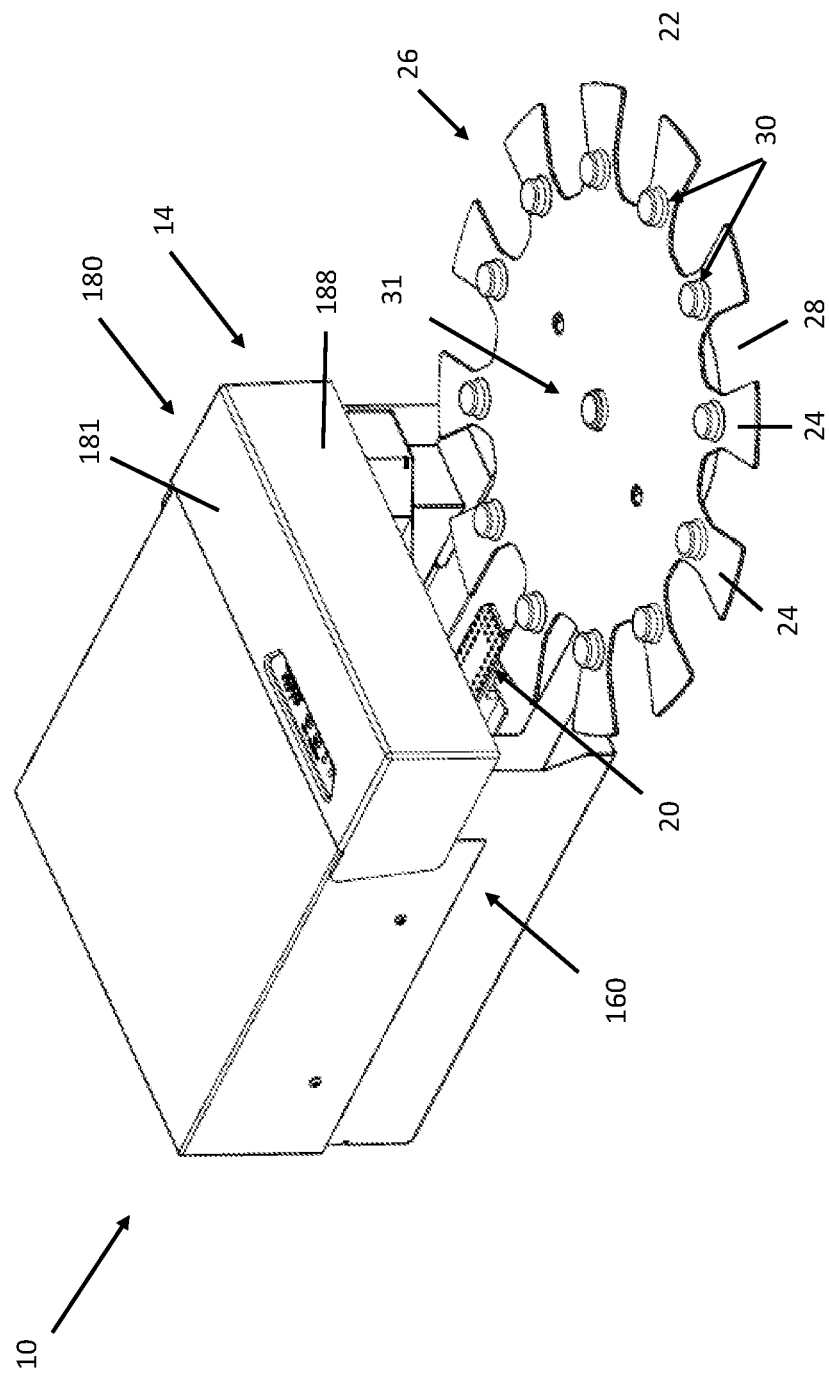
FIG. 1 is a perspective view of a printing system according to one or more embodiments herein.
Figure 2:
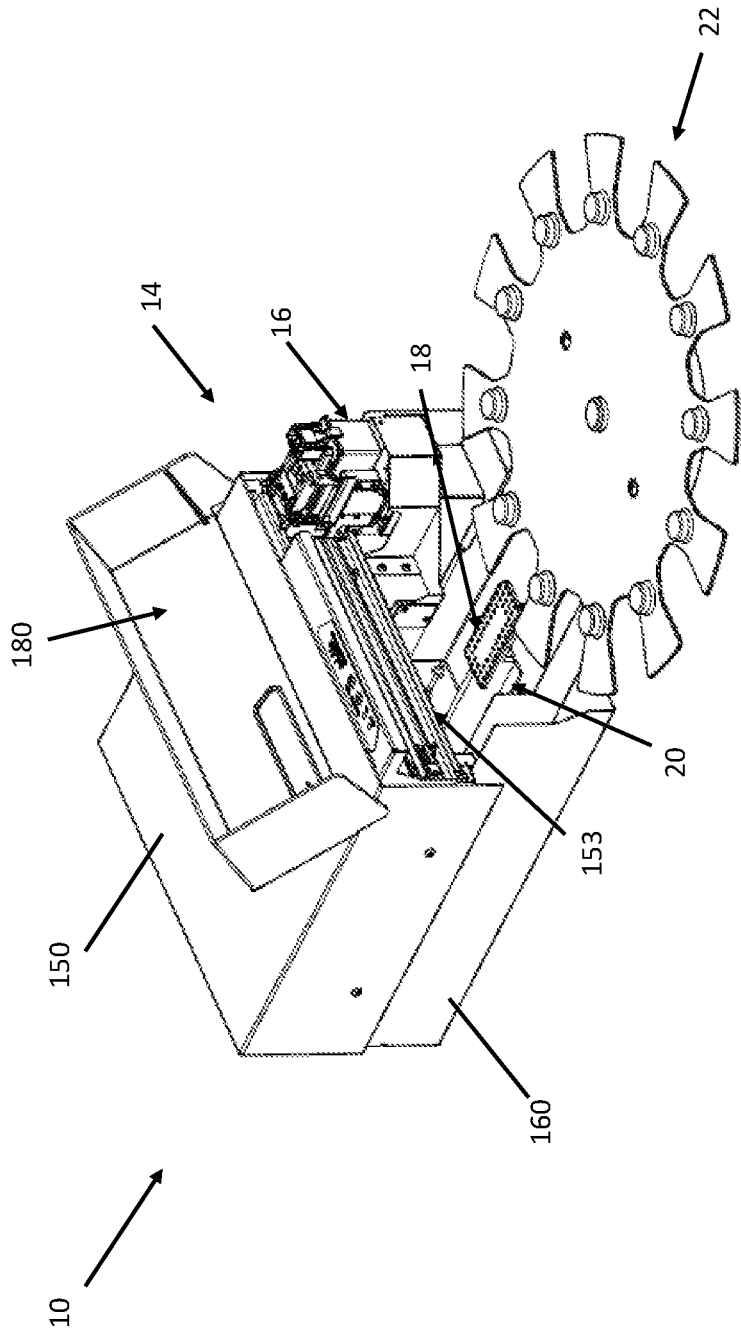
FIG. 2 is a perspective view of the printing system with a cover portion open.
Figure 3:
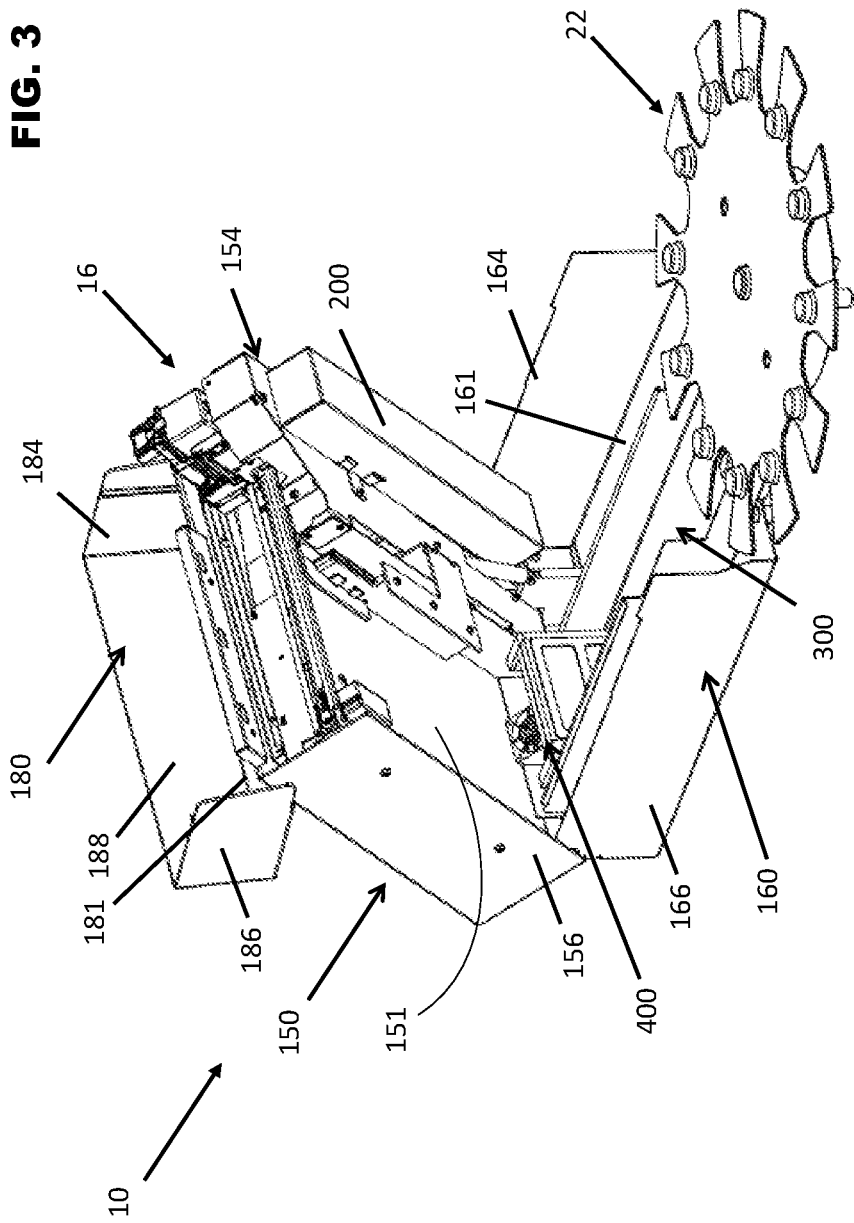
FIG. 3 is a perspective view of the printing system opened about a hinged connection and with the cover portion open.
Figure 4:
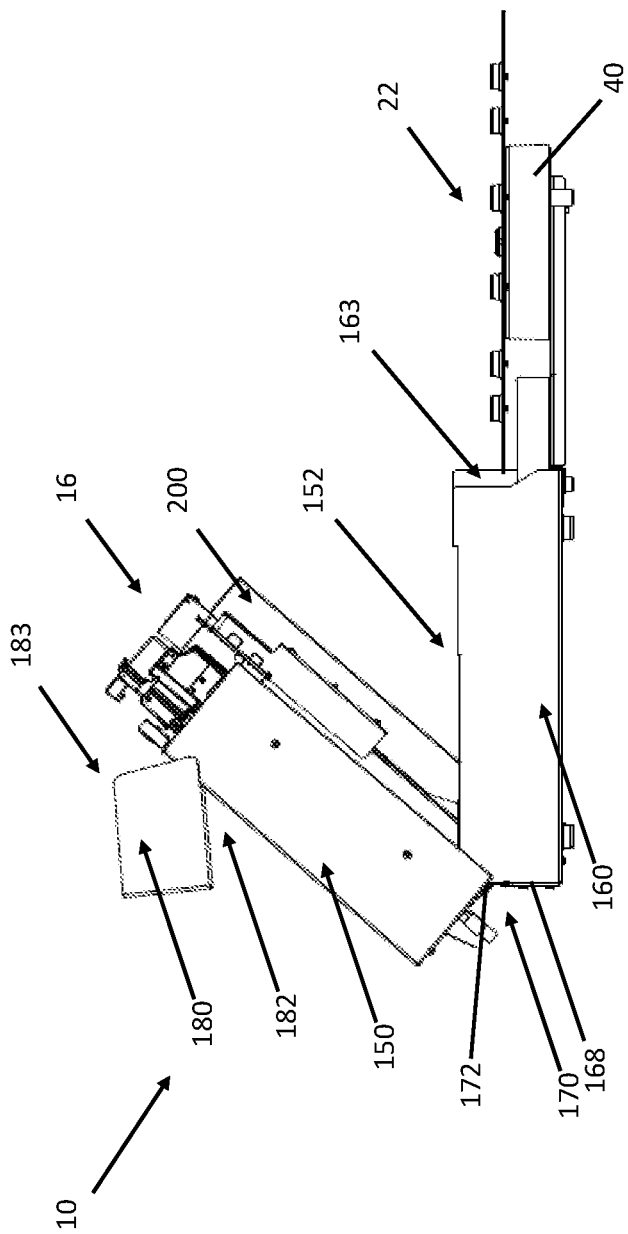
FIG. 4 is a side view of the printing opened about the hinged connection and with the cover portion open.

In the embodiment illustrated in FIGS. 1-6, the printer system 10 is configured as an openable printer system 10. The illustrated embodiment is a table-top printer system 10, however the printer system described herein may be scaled up for industrial use. One example of a mechanism for opening the printer system 10 is a hinged connection 170 between an upper printer body 150 and a lower printer base 160. One or more hinges 172 are positioned along a perimeter length of the printer system 10 and operably connect the upper printer body 150 and lower printer base 160. For example, the hinges 172 are provided along a rear side of the printer system 10 such that a front side of the printer system 10 is a feed side of the printer system 10 wherein products are received for printing therein. In one embodiment, food products 12 enter the printer system 10 in the front and are directed into a cavity 152 between the upper print body 150 and the lower print base 160 for printing within the printer system 10.

The upper printer body 150 supports a frame that allows for supporting one or more print components of the printer, not limited to a print head 16 and carriage and gantry for movement of the print head 16. The print head 16 may be a carriage for holding one or more ink cartridges. The frame may also support an ink maintenance system 200 which is positioned at a standby location of the print head 16 and is configured with a tub for receiving ejected ink during a maintenance or cleaning operation between printing operations and further comprises a filter for catching airborne ink particles and preventing said particles from settling on other printer components. The frame may also carry electronics, control and power elements for the printer and for operably connecting the printer to control software and power sources.

The lower support base 160 may then support a removable debris tray 300 for collecting debris generated during printing as the debris tray is positioned below a print area 18 of the printer 14. The debris tray may slide into and optionally couple to one or more interior surfaces of the lower support base 160. The lower support base 160 may then also support an ink mist collection system 400 which can be positioned in a rear or back portion of the printer 14 within the print area 18 and with a directed air flow to collect spent airborne ink or ink mist and prevent the ink from settling or collecting on other elements within the printer.

As illustrated in FIGS. 1-5 the housing of the printer system 10 described herein is a multi-piece housing with two hinged connections. The upper body housing 150 is connected via one or more hinges 172 along a perimeter side 154 wall to the lower base housing 160 along a corresponding perimeter side wall 164. The upper body housing 150 comprises a top portion 151 and one or more side walls 154, 156, 158 extending downwardly from the perimeter of the top 151 and one side 153 of the top 151 is open. Similarly, the lower base housing 160 comprises a floor 161 and one or more side walls 164, 166, 168 extending upwardly from the perimeter of the floor 161 and one side 163 of the floor 161 is open. The open side 163 allows for an opening to the cavity 152 when the printer housing is closed and through which items are provided to the interior of the printer 10 for printing thereon. This is an operational access opening, which may be considered a front side of the printer 10. The hinged connection 170 may then be provided on a side opposing the operational access opening and thus positioned along a rear side of the printer. For example, the hinges may operably secure one side wall 164 of the lower base housing 160 to a corresponding side wall 154 of the printer body housing 150.

A cover 180 may then be provided and connected via one or more hinges 182 to cover the open side 153 of the top 151 and thus protect a print head 16 or other printer system elements supported by the upper body 150. The cover 180 similarly has a top 181 and side walls 184, 186, 188 with an open side 183 such that the open side 183 is connected to the open side 153 of the upper body housing 150. For example, the hinges 182 connect the top 151 along the open side 153 to the top 181 of the cover along its open side 183. Thus, the hinges 172 and 182 provided hinged connections on opposing sides of the printer 10.

The printer 10 can then be opened and accessed at one or more locations for full or partial access to the printer components within the housing. Each hinged connection allows the printer to be opened up about the hinged connection manually and without tools. The printer can be similarly manually closed to enable printing without tools. When full access is provided, one or more components of the printer system 10 can be manually removed for cleaning.

As these elements and the additional elements described further below are positioned within the printer system 10 they are otherwise inaccessible without disassembly of the printer 10. However the hinged printer housing and the construction described herein allow for easy access to these elements for service, cleaning, and replacement wherein such access is now tool-less and can be done manually without assistance.

One embodiment of the printing system 10 as illustrated in FIGS. 1-6 is configured to receive a food product 12 from a delivery tray 22, to print on a surface of the food product 12 and return the food product 12 to the delivery tray 22. The system is also configured to do so automatically and continuously for a pre-determined number of food items. The system 10 comprises a printer 14 having a print head 16 and nozzles (not shown) wherein the print head 16 and nozzles are configured for printing with edible ink. The printer 14 also supports an extendable and retractable receiving arm 20.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending there between. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products. The print head 16 and associated cartridge and gantry may be carried by the upper printer body 150 and thus are secured to the upper portion of the printer body 150.

In further detail, the receiving arm 20 moves in a direction perpendicular to the print head path such that the receiving arm 20 extends and retracts across or through the path of the print head 16 within the printer. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a coefficient of friction between the receiving arm 20 and the food product for retaining the food product on the arm 20.

The receiving arm extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20 is then retracted to the printing position with the food product 12 thereon. This process continues on continuously and automatically per a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items. The receiving arm 20 is also operably secured to a frame that is carried by the upper body portion 150. The receiving arm 20 extends into the print area 18 in the spacing between the upper printer body 150 and lower support base 160.

The delivery tray 22 is separable from the printer system 10 and is configured with a plurality of holders 26. Each holder 26 is configured to receive and support a food product 12 and deliver said food product 12 to the receiving arm 20. The delivery tray 22 is operably supported by a motorized base 40 that is spaced apart from the printer 14 but may be mechanically secured to the lower support base 160 of the printer via connectors on an arm 50 extending from a housing 52 of the motorized base 40. Delivery of unprinted food products and receipt of said food products between the receiving arm 20 and the delivery tray 22 can be essentially endless, limited only by supply or selection of a predetermined amount to be printed, for example.

In the illustrated embodiment the food product is a dessert item such as a cookie. However, while examples of food items include various shapes, sizes, and types of cookies, the food items that can be printed with this system are not so limited. Frosting sheets, rice paper, bakery goods having at least one substantially flat surface for printing an image thereon, and other food items may be printed using this system. The delivery tray may be configured with positioning mechanisms which are tailored to the specific shape, size, thickness, type etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilizing in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A printer comprising:
 a housing comprising an upper portion and a lower portion with a cavity there between and wherein the upper portion and lower portion are connected by one or more hinges such that the housing opens about the hinged connection between the upper portion and the lower portion to expose the cavity there between, and
 wherein the upper portion is positioned above the lower portion and the hinged connection allows the upper portion to be lifted up with respect to the lower portion to expose one or more printer components for cleaning or maintenance and lowered with respect to the lower portion for printing on a print surface positioned within the cavity between the upper and lower portion, and
 wherein the one or more hinges are provided on a rear side of the housing to connect the upper portion to the lower portion and wherein a front side of the housing, opposing the rear side, comprises an opening for positioning the print surface below a print head and within a print area within the cavity; and
 wherein the printer is a printer for printing on the surface of a food product and wherein one of the upper portion or lower portion operably supports a receiving arm that is movable from a first position outside the printer housing to a second position in the cavity and extendable and retractable across a path of a print head of the printer for providing food products to the print head for printing thereon.

2. The printer of claim 1 wherein the one or more hinges secure the upper portion to the lower portion and wherein the one or more hinges are positioned on a same perimeter side of the housing such that the housing opens about one side.

3. The printer of claim 1 wherein the upper portion has a top and one or more perimeter side walls extending downwardly therefrom and wherein the lower portion comprises a floor and one or more perimeter side walls extending upwardly therefrom such that a rear perimeter side wall of the upper portion and a rear perimeter side wall of the lower portion are connected by the one or more hinges spaced apart along the rear perimeter side wall.

4. The printer of claim 1, wherein the upper portion supports a frame for operably retaining one or more printer components selected from the group consisting of a print head, a gantry for linear movement of the print head there along, a controller for the printer system, a print head ink maintenance system for cleaning one or more nozzles of the print head or combinations thereof.

5. The printer of claim 1, wherein the lower portion comprises a floor and supports one or more removable components for the printer comprising an ink mist collection system, a debris tray or a combination thereof.

6. The printer of claim 1 wherein the lower portion has a floor configured to removably couple to a housing of a motorized base which operably supports a delivery tray that is operational in synch with the receiving arm.

7. The printer of claim 1 wherein the printer is openable about the hinged connection to expose one or more removable components for cleaning, service or replacement wherein the printer is openable and closeable manually and without tools.

8. A printer comprising:
 a housing comprising an upper portion and a lower portion with a cavity there between and wherein the upper portion and lower portion are connected by one or more hinges such that the housing opens about the hinged connection between the upper portion and the lower portion to expose the cavity there between, and
 wherein the upper portion is positioned above the lower portion and the hinged connection allows the upper portion to be lifted up with respect to the lower portion to expose one or more printer components for cleaning or maintenance and lowered with respect to the lower portion for printing on a print surface positioned within the cavity between the upper and lower portion,
 wherein the lower portion comprises a floor and supports one or more removable components for the printer comprising an ink mist collection system, a debris tray or a combination thereof, and wherein the one or more hinges are provided on a rear side of the housing to connect the upper portion to the lower portion and wherein a front side of the housing, opposing the rear side, comprises an opening for positioning the print surface below a print head and within a print area within the cavity.

9. The printer of claim 8 wherein the one or more hinges secure the upper portion to the lower portion and wherein the one or more hinges are positioned on a same perimeter side of the housing such that the housing opens about one side.

10. The printer of claim 8 wherein the upper portion has a top and one or more perimeter side walls extending downwardly therefrom and wherein the lower portion comprises a floor and one or more perimeter side walls extending upwardly therefrom such that a rear perimeter side wall of the upper portion and a rear perimeter side wall of the lower portion are connected by the one or more hinges spaced apart along the rear perimeter side wall.

11. The printer of claim 8, wherein the upper portion supports a frame for operably retaining one or more printer components selected from the group consisting of a print head, a gantry for linear movement of the print head there along, a controller for the printer system, a print head ink maintenance system for cleaning one or more nozzles of the print head or combinations thereof.

12. The printer of claim 8 wherein the printer is a printer for printing on the surface of a food product and wherein one of the upper portion or lower portion operably supports a receiving arm that is movable from a first position outside the printer housing to a second position in the cavity and extendable and retractable across a path of a print head of the printer for providing food products to the print head for printing thereon.

13. The printer of claim 12 wherein the lower portion has a floor configured to removably couple to a housing of a motorized base which operably supports a delivery tray that is operational in synch with the receiving arm.

14. The printer of claim 8 wherein the printer is openable about the hinged connection to expose one or more removable components for cleaning, service or replacement wherein the printer is openable and closeable manually and without tools.

\* \* \* \* \*